UNITED STATES PATENT OFFICE.

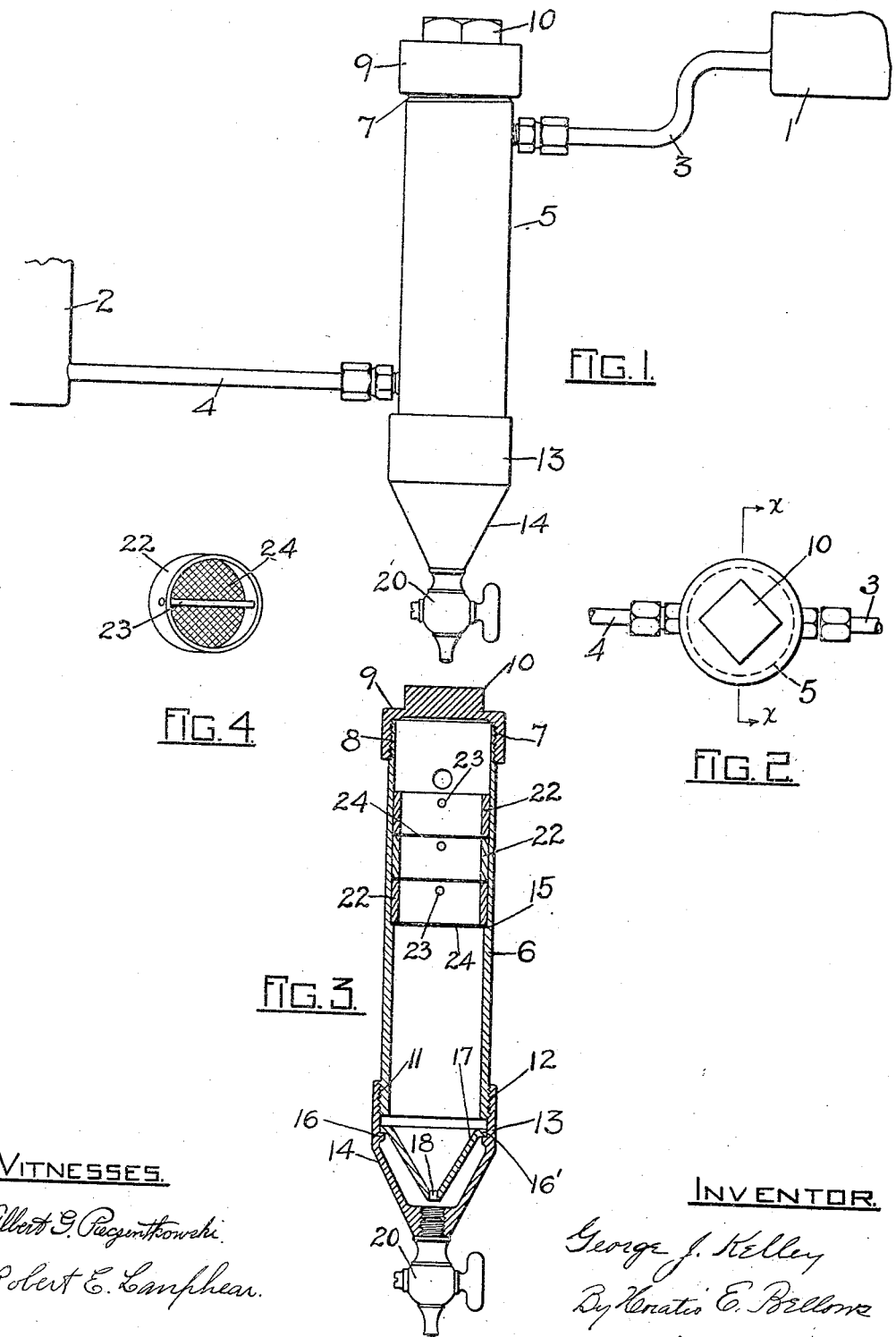

GEORGE J. KELLEY, OF ATTLEBORO, MASSACHUSETTS.

FILTER.

No. 915,185.  Specification of Letters Patent.  Patented March 16, 1909.

Application filed February 8, 1908. Serial No. 414,869.

*To all whom it may concern:*

Be it known that I, GEORGE J. KELLEY, a citizen of the United States, residing at Attleboro, in the county of Bristol and State of Massachusetts, have invented certain new and useful Improvements in Filters, of which the following is a specification.

My invention relates particularly to filters adapted to use upon internal combustion engines or motors and has for its object a novel and convenient form of screen members which shall be readily withdrawn and replaced for the removal of accumulated sediment; and which shall be of a structure to properly interspace the screen layers independently of the filter walls, and to effectually strain the fuel.

To the above ends essentially my invention consists in the novel construction, arrangement, and means of mounting the straining members.

In the drawings, which constitute a part of this invention, Figure 1 is a side elevation of a filter embodying my invention, Fig. 2, a plan view of the same, Fig. 3, a section on line *x x* of Fig. 2, and Fig. 4, a perspective view of one of the strainers.

Like reference characters indicate like parts throughout the views.

My filter is shown mounted for use as is usual in boats, in conjunction with a horizontal fuel tank, 1, and carbureter, 2, connected respectively by the pipes, 3 and 4, to the upper and lower portions of the filter, 5. The filter comprises a cylindrical wall or body, 6, provided upon its upper end with threads, 7, which engage threads, 8, of a removable cap, 9, having a squared projection, 10, to accommodate a wrench. The body is provided upon its lower end with external threads, 11, to engage the threads, 12, of a conical cap, 13, having a conical shaped base, 14. The wall, 6, of the body has its interior upper portion bored to produce an internal annular shoulder, 15, to support a series of strainer members which will be later described in detail. The removable conical cap, 13, 14, comprises a trap. Upon the interior of the wall, 13, is an annular shoulder, 16, upon which rests the flange, 16', of a conical guard plate, 17, provided at its apex with an opening, 18. The lower end of the trap is provided with a drip cock, 20. The straining members are similar in form and dimensions. Each comprises a vertical cylindrical side or wall, 22, in which is fixed near its top a diametrically disposed rod, 23. Soldered to the lower end of the wall, 22, is a screen or perforated plate, 24. These strainers are thus arranged within the filter. The lower edge of the wall, 22, of a filter member rests upon the shoulder, 15; and the other members, two in this instance, have their respective walls resting one on top of the other in a regular series, as shown in Fig. 3. The walls of these members are a tight sliding fit in the wall, 6, and the mesh or openings of the screens, 24, are preferably larger in the upper of the members.

The fuel in its passage from the supply tank, 1, carrying its sediment and water, toward the carbureter, 2, through the pipe, 3, passes by gravity downwardly through the strainers, which intercept the sediment; and out through the pipe, 4, to the carbureter. The greater specific gravity of the water in the hydrocarbon fuel leads it to drop into the trap, 14, through the opening, 18, to which opening it is directed by the conical plate, 17. The water thus accumulates or is trapped in the space between guide plate, 17, and the trap wall, 14, whence it may be drawn off by the cock, 20. After repeated use the sediment accumulates in the straining members and should be emptied at intervals. This is effected by unscrewing and removing the cap, 9. Then the fingers or a hook is inserted into the filter, which engages the cross bar, 23, of each of the strainers in succession, and removes them for cleansing, after which they are slid back into operative position and the cap, 9, is replaced.

It will be noted that the trap is located below the plane of the outlet pipe, 4, and is in no danger of mixing with the fuel which passes therethrough.

The particular cross sectional outline of the filter body and straining members is immaterial.

What I claim is,

1. In a fuel filter for a combustion engine or motor, the combination with the filter body provided with an inlet and outlet in its sides and a conical base, of a straining member in the body, and a conical guard in the conical base below the outlet for trapping the water from the fuel.

2. In a fuel filter for a combustion engine or motor, the combination with the filter body provided with an inlet and outlet and a conical base, of a straining member in the body above the outlet, and a downwardly inclined guard below the outlet.

3. In a fuel filter for a combustion engine or motor, the combination with the filter body provided with an inlet and outlet and a conical base, of a straining member in the body above the outlet, an inclined plate in the base of the body below the outlet and supported upon said base, and an opening in the plate adjacent the bottom of the base.

4. In a fuel filter for a combustion engine or motor, the combination with the filter body provided with a fuel inlet and a fuel outlet, of a strainer in the body intermediate the inlet and outlet, a receptacle in the base of the body for receiving the waste elements contained in the fuel, and a downward inclined guard plate in the base of the body below the fuel outlet for preventing the return of the waste elements.

5. In a fuel filter for a combustion engine or motor, the combination with the filter body provided with a fuel inlet and a fuel outlet, of a strainer between the inlet and outlet, a receptacle in the base of the body for receiving the waste elements of the fuel, a conical guard in the base for preventing the return of the waste elements, and means for drawing off the contents of the receptacle.

6. In a fuel filter for a combustion engine or motor, the combination with a filter body provided with an internal shoulder and with an inlet and outlet, of a straining member mounted in the body, below the inlet and above the outlet, and resting upon the shoulder, said member comprising a side wall, and a horizontal rod in the wall, a conical receptacle in the base of the body, a conical plate above the receptacle and below the outlet provided with an opening in its apex leading to the receptacle.

In testimony whereof I have affixed my signature in presence of two witnesses.

GEORGE J. KELLEY.

Witnesses:
 HORATIO E. BELLOWS,
 JOSEPH E. BURNS.